United States Patent [19]

Brown et al.

[11] 4,416,859
[45] Nov. 22, 1983

[54] COUNTERCURRENT SOLIDS-FLUID CONTACTOR

[75] Inventors: Lloyd C. Brown; Rudi Klasen, both of San Diego, Calif.

[73] Assignee: GA Technologies Inc., San Diego, Calif.

[21] Appl. No.: 235,146

[22] Filed: Feb. 17, 1981

[51] Int. Cl.³ ............................................. B01D 11/02
[52] U.S. Cl. ................................................... 422/261
[58] Field of Search ...................... 261/36 R, 23 R; 202/158; 134/25.5, 25.1, 10; 422/261, 278, 282, 142

[56] References Cited

U.S. PATENT DOCUMENTS

| | | | |
|---|---|---|---|
| 2,632,720 | 3/1953 | Perry | 134/25 |
| 2,639,973 | 5/1953 | Fritz | 23/1 |
| 2,702,434 | 2/1955 | Richardson et al. | 34/57 |
| 2,702,742 | 2/1955 | Hilliard, Jr. | 23/288 |
| 2,867,429 | 1/1959 | Heath | 263/21 |
| 3,003,640 | 10/1961 | Pearce | 210/189 |
| 3,079,222 | 2/1963 | Reeve | 23/1 |
| 3,482,328 | 12/1969 | Larkham | 34/57 |
| 4,032,410 | 6/1977 | Kuxdorf et al. | 202/158 |
| 4,062,697 | 12/1977 | Egli et al. | 134/10 |

Primary Examiner—Hiram H. Bernstein
Attorney, Agent, or Firm—Fitch, Even, Tabin & Flannery

[57] ABSTRACT

A method and apparatus for the countercurrent contacting of solid particles with a fluid is disclosed. The contacting is effected within a multistage tower, each stage having a weir means regulating the flow of particles within and from each chamber so that all particles receive approximately the same exposure to the contacting fluid. The disclosed design is readily scaled up to increase capacity without requiring proportional increases in the vertical dimension which are costly and might result in damage to the particles. The method and apparatus are especially adapted for washing salt from alumina microspheres.

10 Claims, 8 Drawing Figures

COUNTERCURRENT SOLIDS-FLUID CONTACTOR

BACKGROUND OF THE INVENTION

The present invention relates to an apparatus and method for the continuous countercurrent contacting of particulate solids with fluids, and more particularly to the washing of salt from alumina microspheres.

Countercurrent solid-fluid contacting may be used for washing, leaching, absorption, ion exchange or heat transfer. Of particular interest herein is the washing of the copious quantities of salt from alumina microspheres produced by sol-gel technology. The salt must be removed so that the microspheres can be used in heat transfer applications.

Economic and ecological considerations often dictate that a contactor should achieve its objectives with minimal overall fluid flow. Where the objective is to recover cleansed particles, minimal flow translates to less fresh fluid being spent and less spent fluid having to be disposed of. In cases where it is desired that the foreign material be recovered, recovery may be facilitated by the greater concentration of material in a more manageable volume of fluid.

One factor in achieving the efficient use of fluid is the uniformity among the particles in duration of contact with the fluid. Where the duration is not uniform, additional fluid is necessary to ensure thorough cleaning.

Another factor leading to such efficiency is the degree to which partially spent fluid is utilized advantageously. Partially spent fluid may be effective at washing highly contaminated particles, but ineffective at washing relatively clean particles. This principle is employed in countercurrent multistage apparatus where fresh fluid is introduced at the last stage visited by flowing particles and the eventually spent fluid is evacuated at the first stage visited by the particles.

The solid particles must remain fluidized for the contacting to be effective. This imposes a constraint on many contactors that the overall fluid flow rate be above the minimum fluidization velocity of the particles. However, in many applications this minimum overall flow rate will result in an excessive amount of wash liquid required or an insufficient concentration of leach out in the wash fluid.

This inefficiency can be mitigated in designs where the overall flow and the fluidizing flow can be varied independently. U.S. Pat. No. 2,632,720 discloses an apparatus in which the fluidizing flow can be varied independently; however, it may not be raised above the overall flow. Any attempt to increase the fluidizing flow above the through flow will cause liquid down flow along with the solids and result in total liquid mixing in the contactor which would lead to a complete negation of any benefits to be derived from multistaged processing.

A restricted base opening (RBO) design, which is disclosed in U.S. Pat. No. 4,062,697 incorporated herein as though quoted in its entirety, does permit the fluidizing flow in each stage to be varied above the overall flow rate. However, a number of features of the RBO design affect its usefulness and efficiency.

One problem is that particle flow in an RBO device is very sensitive to the fluidizing height of the stage, the recirculation flow and the rate of particles into the stage. As a result of this sensitivity, the RBO contactor must be constantly monitored to maintain effective operation.

Additionally, in the RBO design some particles receive inadequate washing. Statistically, all particles on a stage have the same probability of passing to the next stage during any time period. This means that particles that have just reached the stage have the same probability of passing to the next stage as have the particles that have been on the stage for a long period of time. Consequently, a percentage of the particles travel straight down, or "short circuit", through the stage and thus receive inadequate washing.

SUMMARY OF THE INVENTION

In accordance with the present invention, an improved method and apparatus for the countercurrent contacting of solids with a fluid is presented. The contactor apparatus has a number of chambers stacked one above the other, each chamber defining a stage of the contactor. Generally, particles flow down and fluid flows up between the stages. Each chamber includes a weir means which regulates the rate of particle flow through each stage. The fluidizing flow may be varied above and independently from the overall flow by means of a recirculation loop. Particle flow from a stage, however, is relatively insensitive to recirculation flow, fluidizing bed height, and rate of particle flow into the stage. Thus, constant monitoring is not required to maintain effective operation of the contactor.

In the contacting method presented, the particles move downwardly between stages, but generally horizontally across a fluidizing bed within each stage. Thus, particles cannot short circuit to the next stage. Relatively lower particle bed depth on the stage helps to eliminate the possibility that particles will be crushed. Additionally, the inventive design may be scaled up to handle greater quantities without proportionate increase in contactor height.

The contactor chambers are designed so that the particles flow along a path which is much longer than it is high or wide. Under this condition, the particles approximate plug flow. In plug flow all the particles have the same residence time on the stage and no particles bypass the stage with inadequate contacting. Thus, efficiency is enhanced by the more uniform contacting among all the particles.

The primary object of the present invention is to provide an improved countercurrent solids-fluid contactor.

A second object of this invention is to provide an improved method for washing particulate solids to remove foreign material.

Additionally, it is an object of this invention to provide a method and apparatus for solids-fluid contacting not requiring monitoring to maintain effective operations.

It is still a further object of this invention to provide an apparatus and method whereby all the particles have substantially the same residence time within each of the stages of the apparatus.

It is also an object of this invention to provide a particle path which is relatively long for a given height of the contactor.

Another object of this invention is to provide a design for a countercurrent solids-fluid apparatus which can be scaled up for greater capacity without a corresponding increase in the height of the apparatus.

DESCRIPTION OF THE PREFERRED EMBODIMENT

Figure 1:
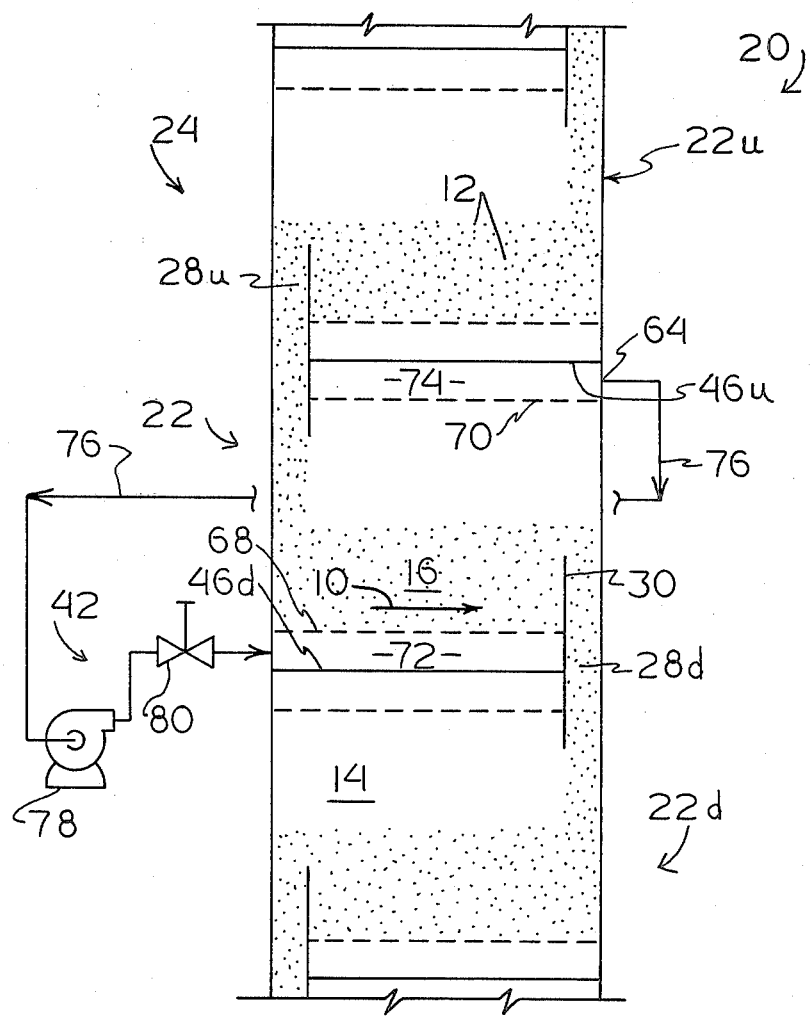
FIG. 1 is a simplified diagrammatic illustration of a countercurrent solids-fluid contactor in accordance with the present invention.

The principles of the present invention are most easily described in connection with the simplified diagrammatic illustration of FIG. 1. A contactor shown generally at 20 comprises a tower 24 including a series of stages 22u, 22, and 22d. (Hereinafter, the corresponding parts of different stages are numbered alike; reference letters "u" and "d" are appended where necessary to designate parts of the upper or lower stage, respectively, corresponding to an unlettered element of the central stage. When all of the corresponding parts are referred to, only the number will be used.) Generally, particles are introduced into the topmost stage and flow downwardly between the stages to be evacuated at the lowermost stage. Fluid is introduced as fresh purge into the lowermost stage and flows upwardly from stage to stage. The particles 12 flow counter to fluid 14.

The following discussion focuses on the operation of the central stage 22. Solid particles 12 flow down from the upper stage 22u through an upper passageway 28u into the central stage 22. Each stage is filled with fluid 14, the overall flow of which is opposite that of the particles. Thus, fluid flows upwardly from the central stage through the upper passageway to the upper stage 22u with sufficient velocity to prevent the fluid within the upper stage from back-mixing with the fresher fluid of the central stage. The particles gravitate toward a bottom wall 46d of the central stage. Within the central stage the downward progress of the particles is limited by a perforated plate serving as a bottom filter 68; the diameter of the holes in the filter may be smaller than the diameter of the particles.

In order for the solids-fluid contacting to be effective, the particles must remain in a fluidized state. To keep the particles in a fluidized state, as well as to prevent the accumulation of particles on the bottom filter 68, recirculating fluid is pumped upwardly through the bottom filter so as to form a fluidized bed 16 with the particles. Fluid is drawn into a recirculation system 42 from the central stage 22 at a recirculation inlet 64 near a top wall 46u of the central stage. The fluid within the recirculation system flows through a recirculation piping 76 to a recirculation pump 78. The latter pumps the fluid through a flow control valve 80 back to the central stage. The reentering fluid enters the central stage at a particle-free bottom space 72 between the bottom wall 46d and the bottom filter 68 to fluidize the particles. A second perforated plate serves as a top filter 70 preventing the particles from entering the recirculation system at inlet 64 and defining a particle-free top space 74 between the top filter and the top wall.

The recirculation pump 78 and flow control valve 80 cooperate to determine the recirculation flow of fluid within the central stage 22. Thus, the recirculation fluidizing flow of the central stage 22 may be varied independently of the overall flow which is the generally upward flow of fluid through the passageways 28d and 28u between the stages. The recirculation systems (not shown) of the upper stage 22u and the lower stage 22d similarly operate to allow the within-stage recirculation flow to be varied independently of the overall flow.

The particles 12, after joining the fluidized bed 16, flow horizontally, as indicated by arrow 10, until their progress is impeded by a weir 30. The particles then flow over the weir, down a lower passageway 28d and into the lower stage 22d wherein the above sequence of events is replicated. The quantity of particles within a stage is determined primarily by the height of the weir 30. Since the height of the weir is fixed, the rate of particles over the weir 30 is determined primarily by the rate of particle flow into the stage. This relative insensitivity to other variable obviates the need for the constant monitoring of the contactor.

The above cycle is repeated in each stage until the particles reach the base of the tower wherefrom they are transported for further processing incidental to this invention.

As the particles progress they contact fresher water in each successive stage. Relatively spent fluid is used to wash the particles only in their most contaminated state. In the last stage, the freshest fluid is used to remove the final increment of foreign material. Thus, the fluid is used efficiently in accordance with its diminishing ability to cleanse the particles.

The contactor, to be operational, must perform functions, the means for which are not illustrated. There must be means at the base of the contactor tower 24 for introducing fresh fluid and evacuating the washed particles. There must be means at the top of the tower for introducing the particles to be washed and for evacuating the spent fluid. Since there are a number of viable alternative structures which will accomplish these means, examples of which are indicated in U.S. Pat. No. 4,062,697, and several of which are within the ken of one ordinarily skilled in the art, these means are described herein by their function only.

Figure 2:
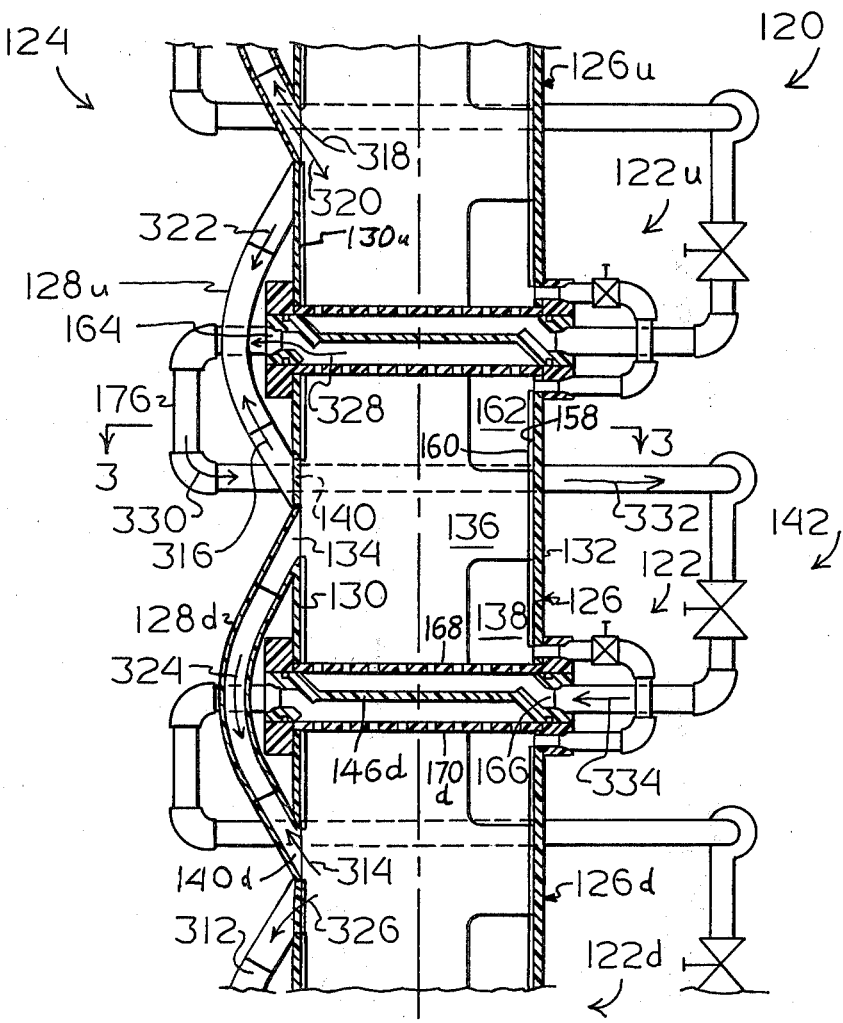
FIG. 2 is a fragmentary cross-sectional view of a countercurrent solids-fluid contactor in accordance with the present invention, taken along line 2—2 in FIG. 3.

A contactor 120 in accordance with the preferred embodiment, illustrated in FIG. 2, comprises a series of stacked stages, 122u (partially shown), 122, and 122d (partially shown). Only three stages are indicated, but the number of stages is not critical to the invention. One operational embodiment utilizes five stages in the washing of alumina microspheres. Structurally, the contactor is in the form of a tower 124 having vertically stacked chambers 126.

There are three primary distinctions between the preferred contactor 120 of the preferred embodiment and the contactor 20 shown diagrammatically. In the first place, the passageways 128 between adjacent stages are external to the preferred tower 124 rather than integral with the tower, as is the case with the passageways 28 of the schematic contactor 20.

Secondly, whereas there is an independent structure identifiable as a weir 30 in the schematic contactor 20, this is not the case with the preferred contactor 120. In the latter case, weir means 130 are provided by a portion of each chamber wall 132 below an opening which serves as a particle outlet 134.

Thirdly, the particle path within each stage of the preferred contactor 120 is not linear as are the within-stage particle paths of the schematic contactor 20. Bisecting partitions 136 with lower cutouts 138 cooperate with the cylindrical chambers to define arcuate paths for the particles as shown by arrow an 310 in FIG. 3. The arcuate path so defined is characterized in that its length is substantially greater than its heighth and width so that the particles approximate "plug" flow through each stage. In "plug" flow all particles spend approximately the same time within each stage so that all particles receive substantially the same amount of contacting or washing.

The general operation of the contactor 120 is indicated in FIG. 2. The contactor tower 124 is completely filled with fluid when in operation. Fluid is introduced as fresh purge at the base (not shown) of the contactor. Relatively fresh fluid enters the lower stage 122d as indicated by flow arrow 312. The fluid flows generally upwardly from the lower stage 122d to the central stage 122 through a lower passageway 128d as indicated at 314; likewise, the fluid flows generally upwardly from the central stage 122 to the upper stage 122u through an upper passageway 128u as indicated at 316. The continued upward movement of the fluid is further indicated at 318.

The particles to be washed are introduced at the top (not shown) of the tower 124. Particles enter the upper stage 122u as indicated at 320. Particles flow over weir means 130u of the upper stage and generally downwardly through the upper passageway 128u as indicated at 322. The particles enter the central stage through particle inlet 40. Particles within each stage flow along an arcuate path; the path within the central chamber 126 is indicated at 310 in FIG. 3. Upon completion of the arcuate path, the particles flow over a weir means 130 of the central stage toward the lower stage 122d through the lower passageway 128d as indicated at 324. The particles then enter the lower stage 122d through a lower particle inlet 140d to begin the next contacting cycle. The particles exit the lower stage as indicated at 326.

Fluid within each stage is recirculated so that the flow rate within each stage may be greater than the overall fluid flow. For instance, with respect to the central stage 122, fluid flows upwardly through the central chamber 126 and into a recirculation system 142 as indicated at 328. The fluid in the recirculation system flows as indicated at 330 and 332. Fluid exits the recirculation system and enters along the imperforate plate 146d defining the bottom wall of the central stage as indicated at 334. The fluid, having entered along the bottom of the central chamber, then proceeds upwardly through the central chamber, fluidizing the particles therein.

Figure 4:
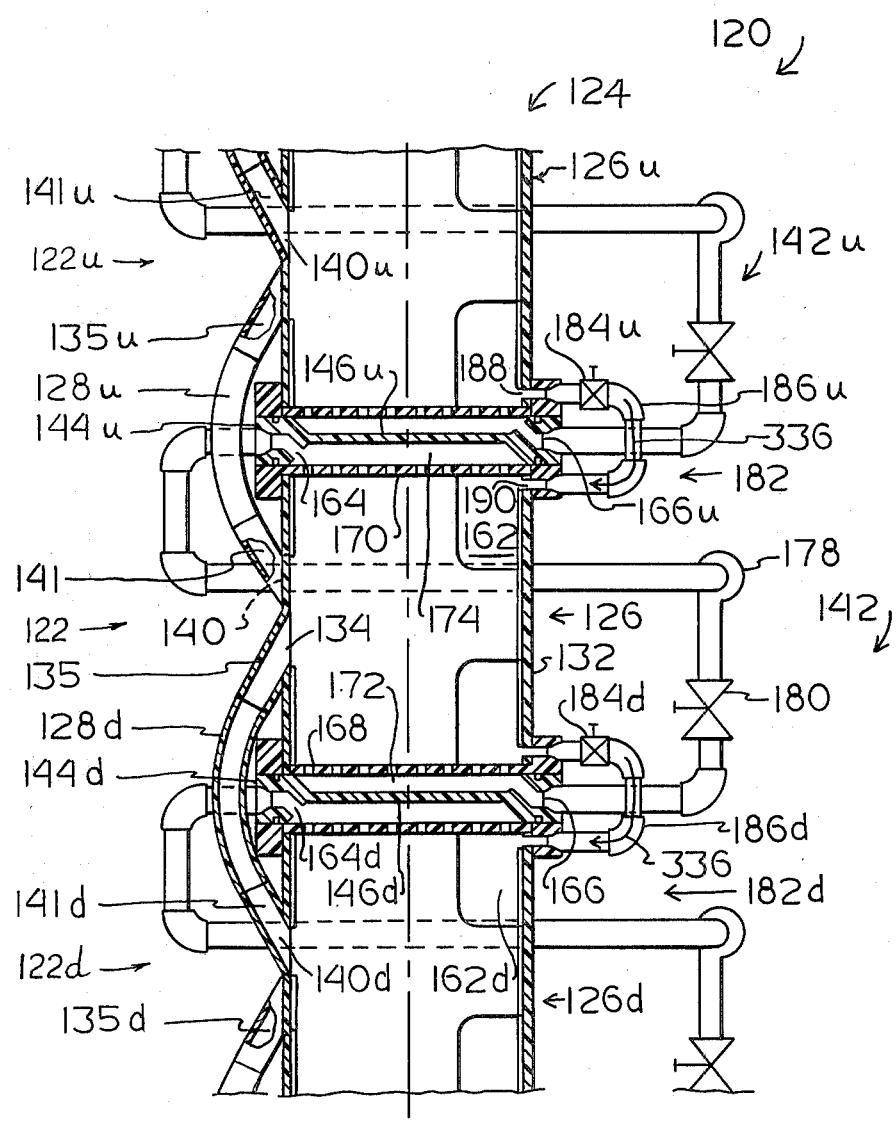
FIG. 4 is the same view as FIG. 2 with other parts numbered.

Describing its structure in greater detail, the contactor tower 124 comprises a series of vertically stacked chambers 126 separated by separators 144 as shown in FIG. 4. The upper separator 144u includes an imperforate plate 146u, which functions as a bottom wall for the upper stage 122u and as a top wall for the central stage 122. Similarly, the lower separator 144d includes an lower imperforate plate 146d, which functions as a bottom wall for the central stage 122 and as a top wall for the lower stage 122d.

Figure 5:
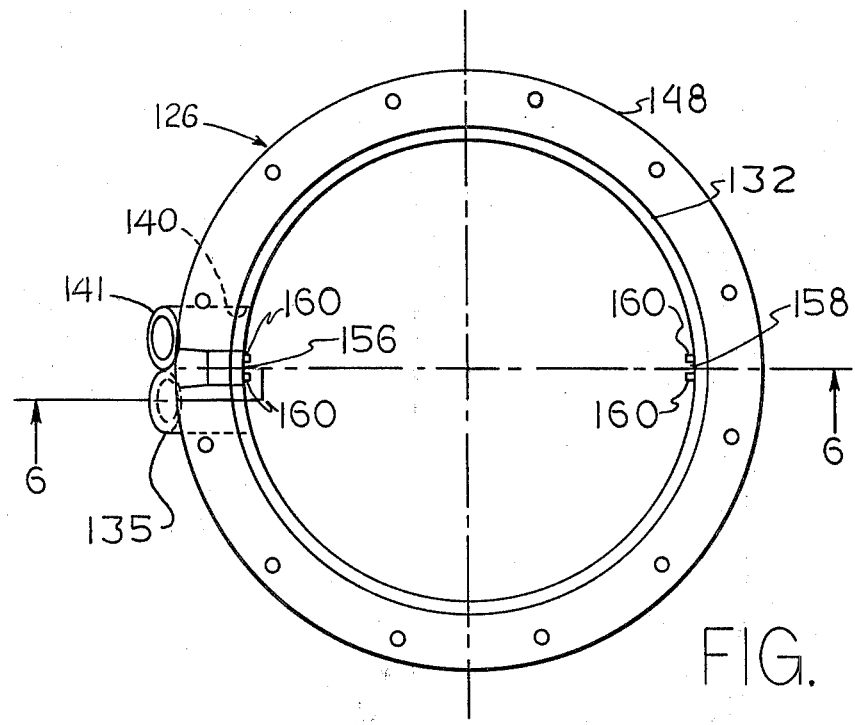
FIG. 5 is a plan view of one of the chambers constituting the contactor of FIG. 2.
Figure 6:
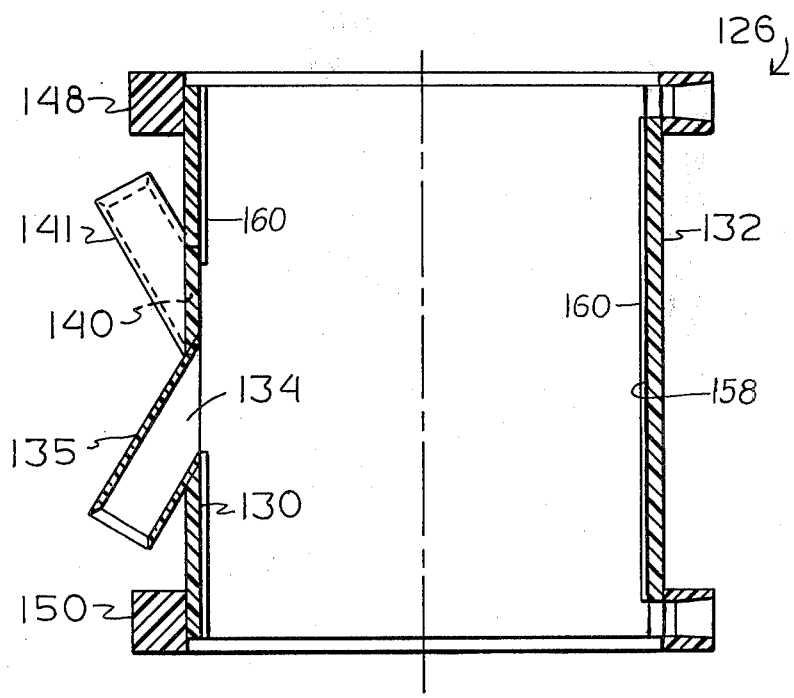
FIG. 6 is a sectional view of the chamber shown in FIG. 5, taken along line 6—6 of FIG. 5.

The chambers are virtually identical, so that central chamber 126 illustrated in FIGS. 5 and 6 is representative. The central chamber 126 is cylindrical, and in this example has a height of 12 inches. Herein, the chamber wall 132 is 0.5 inches thick and has an outer diameter of 10 inches. The chamber has a top flange 148 and a bottom flange 150, which permit the separators 144 to be secured to the chambers as described subsequently.

The central chamber 126 has two pipes extending outwardly from the chamber wall adjacent one another. Herein, particle inlet pipe 141 extends 30 degrees from the vertical in a generally upward direction, and the particle outlet pipe 135 extends at the same degree of obliqueness in a generally downward direction. The pipes are preferably formed of one inch clear plastic tubing. The particle inlet pipe communicates through the particle inlet 140 with the interior of the chamber halfway along the vertical extent of the chamber wall 132. Similarly, the particle outlet pipe communicates with the interior of the chamber through the particle outlet 134. In the central chamber 126 the outlet pipe 135 is counterclockwise of the inlet pipe 141, as shown in FIG. 5, and nearer the viewer as depicted in FIG. 6. In order for the stages to be easily connected, the pipe orientations alternate between adjacent stages. Thus, in chambers 126u and 126d, the inlet pipes 141u and 141d, and outlet pipes 135u and 135d would be reversed from the positions shown in FIGS. 5 and 6. The inlet pipe 141 forms part of the upper passageway 128u between the central stage 122 and the upper stage 122u, and the outlet pipe 135 forms part of the passageway 128d between the lower stage 122d and the central stage, as shown in FIG. 4.

Figure 3:
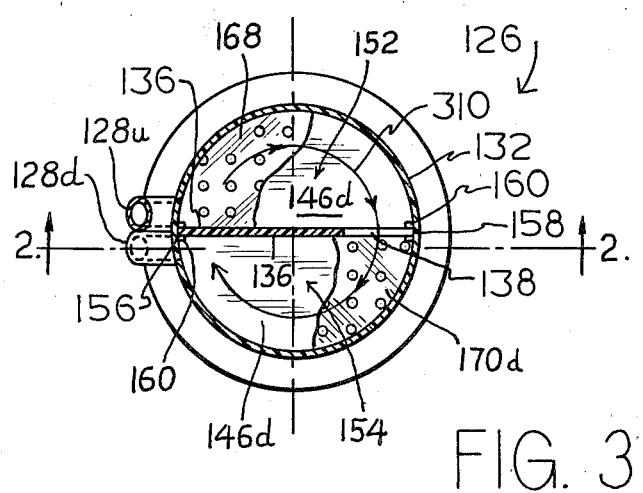
FIG. 3 is a sectional view of the contactor shown in FIG. 2, taken along line 3—3 in FIG. 2.

Each chamber, as shown in FIG. 3 is divided into an inlet region 152 and an outlet region 154 by a vertical partition 136, which is positioned within and held within grooves 156 and 158, each defined by vertical, inwardly projecting ridges 160. The pipe-side groove 156 extends between the areas where the two pipes communicate with the chamber; the opposing groove 158 is opposite the pipe-side groove, as shown in FIG. 5.

As described more fully below, the partition 136 functions to define an extended arcuate path for the particles during the operation of the contactor. The partition preferably is formed from a 3/16 inch sheet of clear plastic; and preferably, the partition is in the shape of a rectangle, the dimensions of which are determined by the stage height and diameter, with two corners along one of the sides cut out.

The lower cutout 138 functions to allow particles and fluid to flow from inlet region of the chamber to the outlet region. The particle path from the particle inlet, through the lower cutout, and to the particle outlet is substantially longer than it is wide or high, providing for plug flow of the particles. The lower cutout may be 6 inches high and 3.25 inches along the bottom.

An upper cutout 162 is formed to facilitate an unloading operation, to be described subsequently. The upper cutout may be 3 inches high and 3.25 inches along the top of the divider. The dimensions of the partition are chosen so that the partition can divide the chamber along a diameter thereof extending between grooves 156 and 158. The side of the partition without the cutouts is inserted in the pipe-side groove 156 and the side with the cutouts is necessarily inserted in the opposing groove 158.

Figure 7:
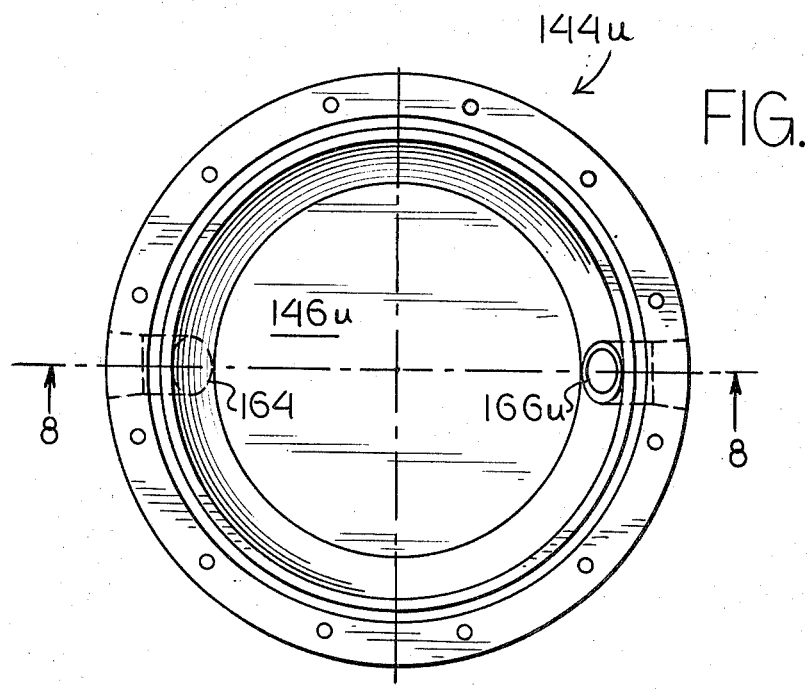
FIG. 7 is a plan view of one of the separators constituting the contactor of FIG. 2.
Figure 8:
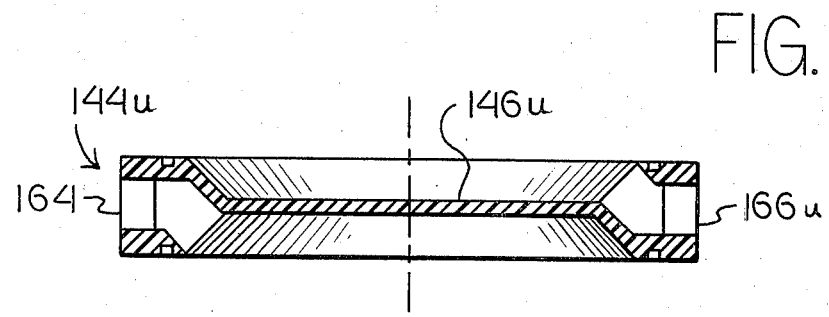
FIG. 8 is a sectional view of the separator shown in FIG. 7, taken along line 8—8 of FIG. 7.

As stated previously, each pair of chambers is separated by a separator. The upper separator 144u is positioned between the upper chamber 126u and the central chamber 126. As depicted in FIGS. 7 and 8, the upper separator includes the upper imperforate plate 146u which serves as a bottom wall for the upper stage and as a top wall for the central stage. Likewise, the lower separator 144d is positioned between the central chamber 126 and the lower chamber 126d. The lower separator includes the lower imperforate plate 146d, which serves as a bottom wall for the central stage and as a top wall for the lower stage. By way of example, each separator may be 12.25 inches in diameter so as to neatly fit the extended top and bottom portions of the chambers of like dimensions. Twelve 9/32 inch holes equally spaced around a circle of 11.5 inches diameter in each separator and in the top flange 148 and the bottom flange 150 of each chamber to allow for means for securing each separator between associated chambers.

The upper separator 144u includes a recirculation inlet 164 of the central stage 122, through which fluid enters the central recirculation system 142 from the central chamber. The upper separator also includes a recirculation outlet 166u, through which fluid exits an upper recirculation system 142u and enters the upper chamber 126u. Likewise, the lower separator, identical to the upper separator shown in FIGS. 7 and 8, includes a recirculation inlet 164d for the lower stage 122d and the recirculation outlet 166 of the central stage 122, through which fluid flows from the central recirculation system into the central chamber.

As indicated above, there are two perforated plates associated with each stage, one functioning as a bottom filter 168 and the other as a top filter 170, as shown in FIG. 4. Herein, the filters are in the form of a 9 and 31/32 inches diameter circular plate of 1/16 inch thick fiberglass. For use with the contemplated alumina microspheres an array of No. 72 diameter holes are drilled within a 9.5 inch diameter circle within the plate. The bottom filter is placed over the bottom of the two separators associated with a stage and serves to define a particle-free bottom space 172 within the associated stage. The top filter is placed over the chamber before the upper separator associated with the chamber is set in place. The top filter serves to define a particle-free top space 174 within the chamber. The filters serve to keep the particles within the fluidized bed path and outside of the recirculation system.

Associated with each stage is a recirculation system such as the central recirculation system 142. Fluid flows from the particle-free top space of the central chamber and into the recirculation system through the recirculation inlet 164, as indicated at 328 in FIG. 2. The fluid proceeds through recirculation piping 176, as indicated at 330 and 332, to a recirculation pump and a flow control valve, the pump and valve determining the recirculation rate. The recirculation fluid exits, as indcated at 334, the recirculation system through the recirculation outlet 166, and reenters the particle-free bottom space 172 of the central chamber.

In order that the contactor 120 may be cleaned between uses, and that the tower 124 can be easily drained once the washing process is completed, the stages are interconnected by a piping or unloading system 182 having normally closed valves 184. The unloading system includes U-shaped pipes 186 having an inlet 188 at the lower of two adjacent stages and an outlet 190 at the top of the bottom of the upper of the two stages. When each of the drain valves 184 is opened by a contactor operator, fluid flows downwardly, as indicated at 336 in FIG. 4, from one stage to the next lower stage when means for draining the tower at the base of the tower (not shown) is actuated. The upper cutouts 162 of the partitions 136 provide for passage of the draining fluid to facilitate the unloading operation.

The method of solids-fluid contacting is described in greater detail as follows. Particles introduced in contaminated form, e.g., as salty alumina microspheres, by appropriate means at the top of the tower, flow generally downwardly through the stages and associated passageways. Eventually the particles, now washed, are evacuated by appropriate means at the base of the tower.

Fluid introduced as fresh purge by appropriate means at the base (not shown) of the contactor, flows generally upward through the chambers and associated passageways. The purge may be introduced along with the recirculation flow of the lowermost stage. Water is suitable and economical for the washing of alumina microspheres. In most cases, as a contacting fluid washes the particles, its effectiveness diminishes. Thus, the fluid in the upper stages is less effective than that in lower stages. Eventually the spent fluid is evacuated at the top of the tower by appropriate means.

Again, the invention is best conveyed by focusing on the operation of a single stage 122 and its cooperation with the adjacent stage above 122u and the adjacent stage below 122d. Superimposed upon the generally upward overall fluid flow is a recirculation flow. Some of the fluid in chamber 126 flows upward toward the imperforate plate 146u defining the top of the central stage 122. Fluid then enters the recirculation system 142 at the recirculation inlet 164. Fluid in the recirculation system flows around the contactor toward 124 and through a recirculation pump 178 and a flow control valve 180. The recirculated fluid exits the recirculation system at a recirculation outlet 66 and reenters the central chamber 126 along the imperforate plate 146d defining the bottom of the central stage. The fluid then flows generally upward through the chamber 126 to repeat the cycle. The overall flow entering chamber 126 from passageway 128d insures that the recirculating fluid is continually replenished by fresher fluid from lower stage 122d below.

The particles flow downwardly from the upper stage 122u through upper passageway 128u entering the central chamber 126 at a particle inlet 140 located about midway between the bottom and top of the central chamber. Particle travel within the central chamber is confined by the bottom filter 168 and the top filter 170, each of which is in the form of a perforated plate; the holes of the plates preferably have a diameter smaller than that of the particles so that the particles can not pass through the filters. The filters 168 and 170 serve to keep the particles out of the recirculation system and from the adjacent areas within the chamber where the fluid flow is more lateral than upward. The particles are thus confined, while in stage 122, with a generally upward flow serving to maintain fluidization of the particles.

The recirculation flow rate, adjusted by means of the flow control valve 180, is selected so that a fluidized bed is formed in conjunction with the particles in the lower half of the chamber 126. In the preferred embodiment one gallon per minute is a suitable recirculation rate. The partition 136 further constrains particle travel to an arcuate path 310 (FIG. 3) along the wall 132 of the central chamber from particle inlet 140 to particle outlet 134. After entering an inlet region 152 of the central chamber from inlet 140, particles flow within the inlet region until they pass through the cutouts 138 and 162 of the partition. Most of the particles flow through the lower cutout 138; the upper cutout 162 functions primarily during the unloading of fluid from the tower 124. Once particles pass through the cutouts, they flow within an outlet region 154 of the central chamber toward the particle outlet 134. The partition 136 ensures that the length of the particle path is large relative to the height and width of the fluidized bed so that the particles approximate plug flow. In plug flow all particles have the same residence time on a stage so that no particles bypass the stage with inadequate washing.

The lower portion of the wall 132 of the central chamber 126 toward the end of the particle path of stage 122 functions as a weir means 130 shown in FIGS. 2 and 6. The upper extent of the lower portion of the wall is defined by particle outlet 134. The 5" height of the weir means is selected to maintain an effective and efficient particle flow when the apparatus is used in conjunction with the washing of alumina microspheres. The recirculation flow is selected so that the bed is fluidized. Once this minimum flow is achieved, recirculation flow is not critical in determining the rate of particle flow from the stage.

Particles reaching weir means 130 and particle outlet 134 flows downwardly through the lower passageway 128d against the upward overall fluid flow from the lower stage 122d. The particles flow from the lower passageway through a particle inlet 140d into chamber 126d of the lower stage 122d. The process described for stage 122 is substantially repeated at stage 122d except that the fluid being nearer to the purge fluid inlet (not shown) is fresher. The fresher fluid is necessary at the later stage 122d to effectively wash the particles which are relatively "cleaner" than they were upon entering the earlier stage 122.

Generally, particle flow is not sensitive to variations in overall flow. In some applications, as in the washing of alumina microspheres, the fluid becomes denser as it is spent. In such applications, the overall flow must be sufficient to prevent the back-mixing of fluid from an upper stage 122u to a lower stage 122d in order to preserve the advantages of multistage processing. Once this easily achieved minimum is attained, overall flow is not critical. In the preferred embodiment an overall flow rate of about one-fourth gallon per minute is used.

The cycle described for stage 122 is typical for all the stages. The particles entering the lowermost stage are finally evacuated for further processing or use outside the scope of this invention.

Many modifications of the above embodiment are possible. In particular, the disclosed design is readily "scaled-up" so that increased quantities of particles and fluids can be handled. The enlarging is accomplished primarily by increasing the diameter of the tower. The ease with which the design may be practically modified for larger quantities can be contrasted with the problems in enlarging the RBO system. The conical design of an RBO system requires that the tower height be increased with the tower diameter. The resulting increased pressure drop would require a very high recirculation flow rate, which might damage the microspheres.

In accordance with the above, an improved countercurrent solids-fluid contactor is presented. While the invention is suitable for many applications, the embodiment described is particularly well suited for the washing of salt from alumina microspheres. The generally lateral movement of the particles provides a particle path which is relatively long for the given height of a contactor. The particle path within a stage is arranged so that all the particles have substantially the same residence time within the stage; this is a factor in providing efficient contactor operation. The particle flow within and from stages is determined primarily by the rate of particle flow into the stage, and is relatively insensitive to operational variables. Thus, the contactor does not require continuous monitoring. Finally, the design presented can be conveniently up-scaled to handle greater capacities.

Several variations of the preferred embodiment are suggested in the above description. Other modifications in structure and method are possible without going beyond the spirit and scope of the present invention.

What is claimed is:

1. A countercurrent solids-fluid contactor comprising:
   a tower having means for defining a plurality of stages disposed one above the other;
   means in communication with the uppermost stage for introducing particulate solids;
   means for introducing fluid into the lowermost stage; and
   passage means for allowing fluid to flow upwardly between each pair of vertically adjacent stages and for allowing particles to flow downwardly between each pair of vertically adjacent stages;
   each said stage including recirculation means substantially independent of said passage means for drawing fluid from the upper portion of each stage and recirculating it into the bottom of the same stage in such a manner as to fluidize particles within the stage;
   each said stage including an associated means for keeping the quantity of particles on a given stage substantially fixed independently of the rate of particle flow from stage to stage through the passage means during operation of the contactor so that the particles receive uniform contacting.

2. A countercurrent solids-fluid contactor comprising:
   a tower having means for defining a plurality of stages disposed one above the other;
   means in communication with the uppermost stage for introducing particulate solids;
   means for introducing fluid into the lowermost stage; and
   passage means for allowing fluid to flow upwardly between each pair of vertically adjacent stages and for allowing particles to flow downwardly between each pair of vertically adjacent stages;
   each said stage including recirculation means substantially independent of said passage means for drawing fluid from the upper portion of each stage and recirculating it into the bottom of the same stage in such a manner as to fluidize particles with the stage;

each said stage including an associated weir means for keeping the quantity of particles on a given stage substantially fixed independently of the rate of particle flow from stage to stage through the passage means during operation of the contactor so that the particles receive uniform contacting.

3. The contactor of claims 1 or 2 further characterized in that each stage includes a path followed by the particles in traversing the same stage, the length of the path exceeding the height of the path.

4. The contactor of claims 1 or 2 further characterized in that the recirculation means for the lowermost stage includes the means for introducing fresh fluid into the lowermost stage along with the recirculated fluid.

5. The contactor of claims 1 or 2 further comprising overflow means in communication with an upper portion of the uppermost stage.

6. The contactor of claims 1 or 2 further comprising means for draining fluid from the tower.

7. The contactor of claims 1 or 2 further comprising means for regulating the recirculation rate within each stage.

8. The contactor of claims 1 or 2 further comprising filter means for keeping the particles out of the recirculation means associated with each stage.

9. The contactor of claims 1 or 2 further characterized in that each stage includes a cylindrical chamber for solids-fluid countercurrent contacting therein and a partition for confining the particles to a path along the chamber wall.

10. The contactor of claims 1 or 2 further comprising means for removing the overflow of fluid from the upper portion of the tower.

* * * * *

UNITED STATES PATENT AND TRADEMARK OFFICE
CERTIFICATE OF CORRECTION

PATENT NO. : 4,416,859
DATED      : November 22, 1983
INVENTOR(S): Lloyd C. Brown and Rudi Klasen It is certified that error appears in the above-identified patent and that said Letters Patent is hereby corrected as shown below:

Column 5, line 14, change "arrow an" to --an arrow--.

Column 7, line 61, change "indcated" to --indicated--.

Column 8, line 3, delete "lower" and insert --bottom of the upper--.

Column 8, line 4, delete "bottom of the upper" and insert --lower--.

Column 8, line 40, change "toward" to --tower--.

Column 8, line 43, change "66" to --166--.

Column 9, line 34, change "flows" to --flow--.

Signed and Sealed this

Tenth Day of April 1984

[SEAL]

Attest:

GERALD J. MOSSINGHOFF

Attesting Officer

Commissioner of Patents and Trademarks